INVENTOR
EUGENE B. BARCARO

BY Edward M. Hassell

ATTORNEY

Aug. 16, 1966 E. B. BARCARO 3,266,196

TAPE CLEANING MEANS

Filed Oct. 22, 1962 2 Sheets-Sheet 2

United States Patent Office 3,266,196 Patented August 16, 1966

3,266,196
TAPE CLEANING MEANS

Eugene B. Barcaro, Norristown, Pa., assignor to Sperry Rand Corporation, New York, N.Y., a corporation of Delaware Filed Oct. 22, 1962, Ser. No. 232,148
2 Claims. (Cl. 51—135)

This invention relates to magnetic recording tapes, and more particularly to means for cleaning such tapes.

Much of the magnetic tape in use at the present time includes a plastic, Mylar or similar type backing having a magnetic oxide coating providing a recording surface. During a read-in operation, the tape is moved past a recording head and coded information is recorded by means of magnetizing discrete spots of the oxide coating. During a read-out operation, the recorded tape is moved past a read head and the recorded spots are detected.

Because of the high packing density of the information on the tape, the recording surface of the tape must be kept free of all foreign materials, as well as bits which may flake off the recording surface, in order to maintain intimate contact of the tape with the head. Tape defects, which include foreign matter or irregularities in the tape suface, cause loss of information by moving the tape away from the read and/or record head. If a small portion of the tape is separated from the head by even a very small distance, the read voltage pulse amplitude will be appreciably reduced.

The building up of foreign material on the surface of the tape eventually causes the tape to be discarded because of the excessive drop-outs. This adds considerably to the cost of maintaining stored type information. Also, if information is lost, by defective tapes, valuable computer time is also lost.

In addition to the disadvantages mentioned above, a tape having foreign particles on it tends to wear the magnetic head with which it is associated during operation.

Sometimes even new tapes have ridges or burrs of oxide on its edge which cause reel-up to be uneven and result in distorting the tape. Burrs are also often formed by the normal slitting of new tape by the manufacturer, with these burrs being formed on the back of the tape. The burrs or ridges may also be formed by normal wear on a slightly misaligned tape handler.

Many methods have been used in the past to clean tape. However, most of these methods have used excessive scrapping which tend to wear the tape excessively as well as destroying the recorded information. Other methods have employed techniques which have involved ultrasonic cleaners, cleansers and other cumbersome, inconvenient and slow techniques.

It is an object of this invention to provide means for refurbishing used recording tapes to minimize drop-outs due to wear without destroying the recorded information on the tape.

It is a further object of this invention to provide means for improving tape performance and reliability by preventing excessive oxide buildups on a recording head or the recording tape.

It is still a further object of this invention to provide means for extending the useful life of a tape.

It is still a further object of this invention to provide means for reducing magnetic head wear resulting from defective tape.

It is still a further object of this invention to provide means for reducing the number of rejected new tapes because of excessive drop-outs.

It is still a further object of this invention to provide means to permit the use of inferior grades of tape on compatible systems.

It is a further object of this invention to provide means for producing a usable electroless plated Mylar recording tape.

It is still a further object of this invention to provide means for reducing the effects of edge damage on recording tapes.

In accordance with the present invention, a means for cleaning a magnetic tape are provided. The magnetic tape is moved over the surface of an element having high polishing characteristic. Different surfaces of the polishing element contact the magnetic tape during the movement thereof.

Other objects and advantages of the present invention will be apparent and suggest themselves to those skilled in the art, from a reading of the following specification and claims in conjunction with the accompanying drawings, in which:

Figure 1:
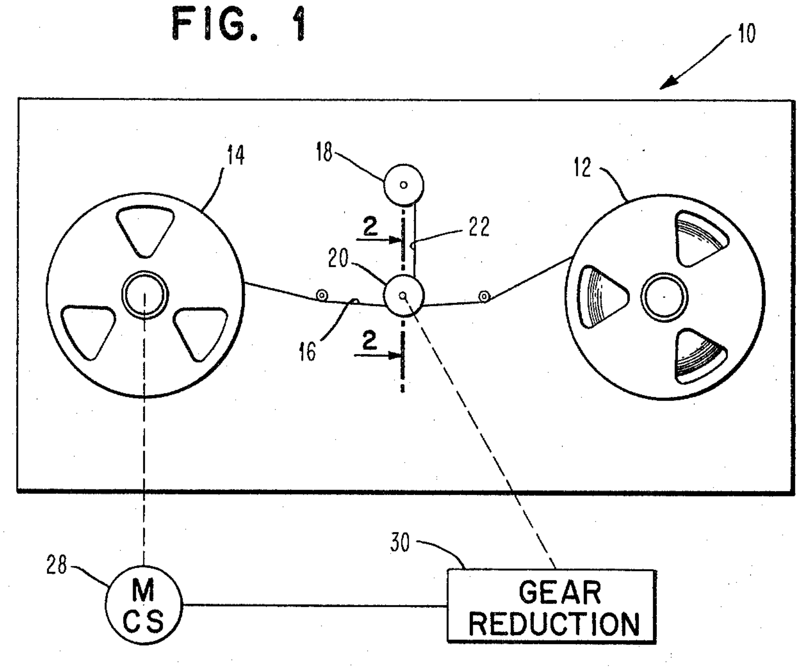
FIG. 1 illustrates a means for cleaning a magnetic tape, in accordance with the present invention.

Referring particularly to FIG. 1, a tape cleaning device 10 includes a supply reel 12 and a take up reel 14. A magnetic tape 16 which is to be cleaned passes from the supply reel 12 to the take up reel 14.

Figure 2:
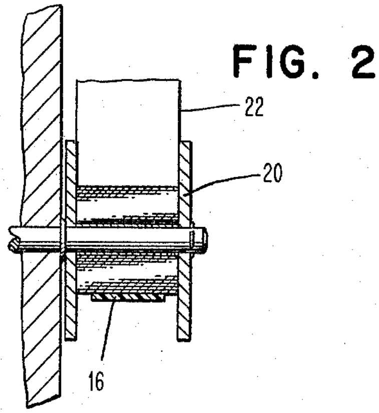
FIG. 2 is a view taken along lines 2—2 of FIG. 1.
Figure 3:
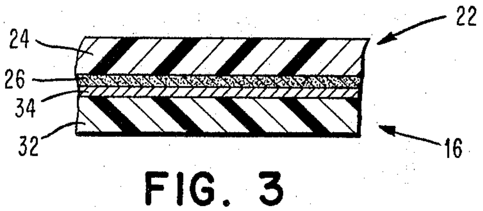
FIG. 3 is an enlarged cross-sectional view of the information and cleaning tapes illustrated in FIGURES 1 and 2.

Cleaning elements include a pair of reels 18 and 20 including a tape 22. As may be seen more clearly in FIGS. 2 and 3, the tape 22 includes a Mylar base 24 having a coating of a polishing material 26. The information tape 16 includes a Mylar base 32 with an oxide coating 34. The coating of polishing material 26 engages the oxide coating 34 during a cleaning operation.

The take up reel 14 is driven at a relatively high speed by a motor 28. The motor 28 also drives the reel 20 through a gear reduction mechanism 30. The tape 22 including the coating of polishing material 26 is moved at a relatively low speed with respect to the high speed of the magnetic tape 16.

As the tape 16 contacts the tape 22, a polishing or cleaning operation takes place. The oxide coating 34 includes the recorded information in the form of magnetized particles. After a tape has been in use for some time, particles of dirt 36 (see FIGURE 4) tend to build up or gather on the oxide coating 34. It is one of the purposes of the present invention to remove these particles of dirt, which may include oxide particles or other foreign material, without substantially affecting the information stored in the oxide coating 34.

Figure 4:
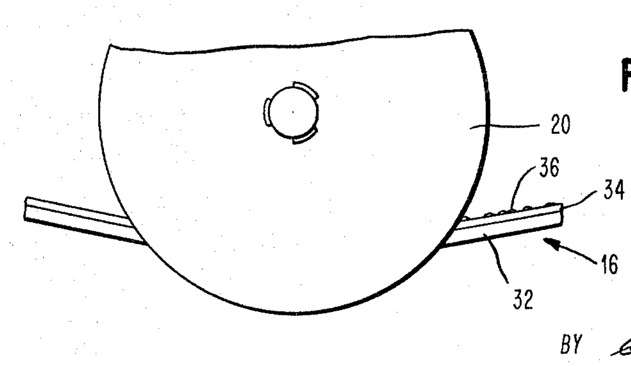
FIG. 4 is an enlarged view of a portion of FIG. 1.

Referring particularly to FIG. 4, it is seen that the tape 16 including the particle 36 is passed in contact with the tape 22 (the tape 22 being illustrated in FIGURE 1). After passing the tape 22, the tape 16 is free of the dirt particles 36.

In carrying out the above operation, it is important that the tape 16 is not scrapped so that to destroy the information stored in the oxide coating 34. Therefore, the polishing material 36 should be of such a characteristic so as to remove the dirt particles 36 without substantially affecting the oxide coating 34. Various types of polishing material may be employed for this purpose. In practicing the present invention, a coating of chromic oxide was employed with highly satisfactory results. Other non-magnetic fine polishing elements having the polishing characteristic of chromic oxide may be found.

In practicing the present invention, it is desirable to move the tape 22 at a relatively low speed so as to expose different surfaces of the polishing material to the magnetic tape 16. If this were not done, it is possible that dirt removed between tape 22 would fall back onto the tape 16.

If desired, brushes may be employed to contact the tape 16 after the polishing operation to remove any loose particles on the tape 16. Also, vacuum means may be employed to remove the particles of dirt after the polishing operation, as will be described hereinafter.

Figure 5:
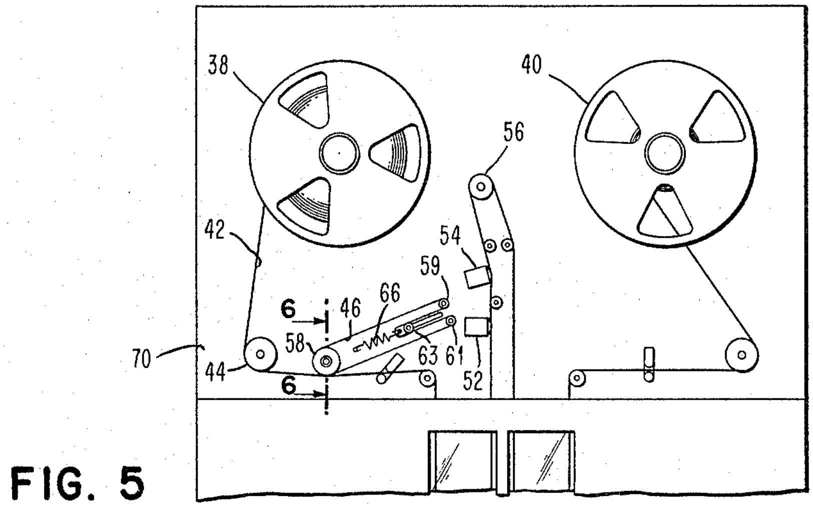
FIG. 5 illustrates another embodiment of a tape cleaning mechanism, in accordance with the present invention.

It is understood that numerous other means removing foreign particles after the polishing operation may be employed. Referring particularly to FIG. 5, another embodiment of the present invention is illustrated. The cleaning means is actually incorporated into a computer type machine and may be employed during operation of the computer. This is somewhat different than in the embodiment of FIG. 1, which illustrates a cleaning machine independent of the computer system.

A supply reel 38 and a take up reel 40 are provided for the tape 42. The tape 42 passes over a roller 44 to engage a polishing tape 46. After the tape 42 has been polished it is passed through additional rollers and contacts magnetic read and write heads 52 and 54. The tape 42 than passes over the roller 56, other rollers, and finally to the take up reel 40.

The tape 46 is in the form of an endless loop. The tape 46 passes over a vacuum drum 58, a pair of rollers 59 and 61 and a third roller which rides within a slot and mechanically connected to be pulled by the spring 66. The spring member 66 maintains the tape 46 under tension during operation. The vacuum drum 58 may be driven by a motor (not illustrated).

Figure 6:
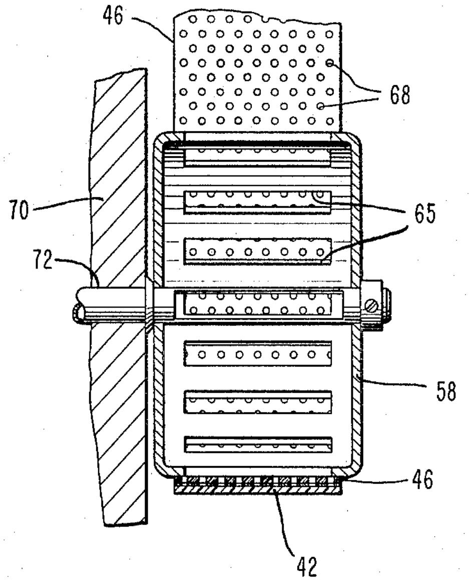
FIG. 6 is a cross-sectional view taken along lines 6—6 of FIG. 5.

The tape 46 may include a Mylar or other suitable base material having a polishing element coated thereon. The tape may actually be in the form of a mosaic and include a plurality of apertures 68, as may be seen more clearly in FIG. 6.

The vacuum drum 58 may be attached to a housing 70 which in turn may be connected to any suitable vacuum means by means of a tubing 72.

During operation, the dirt or other foreign particle is removed from the magnetic tape 42 by means of the polishing material on the tape 46. As the foreign material is removed, it passes through the apertures 68 of the tape 46 and through the openings 65 in the vacuum drum 58. Thus, the dirt particles are removed away from the tape as soon as the tape 42 is polished. Of course, as previously mentioned, brush or other means may be employed to remove the particles from the tape.

Again, the polishing tape 46 is moved at a relatively low speed to expose different surfaces to the magnetic tape 42 during operation.

The present invention has provided a relatively simple means for refurbishing used recording tapes. It accomplishes this by removing foreign particles from the tape without substantially affecting the recorded information on the cleaned tape. Thus, an old tape may be used for a much longer time than was possible prior to the present invention.

It is also noted that oxide particles will not tend to build up on the magnetic heads since these particles are removed prior to engaging the head. This greatly reduces the degree of magnetic head wear.

Because of the smooth surface on the tape made possible through the present invention, the quality of the tape used for certain systems may be cheaper or inferior in many cases without affecting the overall operation of the system in which the tape is used.

It is noted that even on brand new tapes, the present invention may be employed to remove rough edges or burrs incurred during the manufacture of the tape.

The embodiments of the invention in which an exclusive property or privilege is claimed are defined as follows:

1. A tape cleaning device for cleaning a magnetic tape comprising a vacuum means, a cleaning tape having perforations throughout its width and a coating of dry polishing agent in the area between said perforations on the top side of said cleaning tape, drive means for moving said magnetic tape and said cleaning tape in the same direction and over said vacuum means with the bottom side of said cleaning tape contacting said vacuum means and said top side of said cleaning tape simultaneously contacting said magnetic tape while said tapes move over said vacuum means, said drive means being operative to move said cleaning tape over said vacuum means at a lower speed than said magnetic tape for abrasively contacting said magnetic tape during the movement thereof to loosen particles from said magnetic tape so that the loosened particles pass through said perforations into said vacuum means.

2. The invention as set forth in claim 1 wherein said polishing agent comprises chromic oxide.

References Cited by the Examiner

UNITED STATES PATENTS

| | | | |
|---|---|---|---|
| 1,089,453 | 3/1914 | Wood | 15—100 X |
| 1,237,047 | 8/1917 | Howell | 15—100 |
| 1,623,528 | 4/1927 | De Moos | 15—100 X |
| 1,914,890 | 6/1933 | Mackler | 15—100 |
| 1,925,917 | 9/1933 | Chalon | 162—358 X |
| 1,927,284 | 9/1933 | Howell | 15—100 |
| 2,008,402 | 7/1935 | Regan. | |
| 2,688,567 | 9/1954 | Franck | 51—135 X |
| 2,905,767 | 9/1959 | Eckert et al. | 179—100.2 |
| 3,019,464 | 2/1962 | Grunwald et al. | 15—100 |
| 3,035,295 | 5/1962 | Buslik et al. | 15—100 X |
| 3,059,266 | 10/1962 | Cleveland | 15—308 |
| 3,069,815 | 12/1962 | Valentine | 179—100.2 X |
| 3,071,455 | 1/1963 | Harman et al. | 51—308 |
| 3,073,913 | 1/1963 | Fay | 179—100.2 |
| 3,093,535 | 6/1963 | Brauns et al. | 162—358 X |

FOREIGN PATENTS

| | | |
|---|---|---|
| 215,152 | 9/1941 | Switzerland. |

MORRIS O. WOLK, *Primary Examiner.*

DONALL H. SYLVESTER, *Examiner.*

J. ZATARGA, *Assistant Examiner.*